US009481054B2

(12) United States Patent
Desjoyeaux et al.

(10) Patent No.: US 9,481,054 B2
(45) Date of Patent: Nov. 1, 2016

(54) METHOD FOR MANUFACTURING AN AIR INTAKE STRUCTURE FOR A TURBOJET ENGINE NACELLE

(71) Applicant: AIRCELLE, Gonfreville l'Orcher (FR)

(72) Inventors: Bertrand Desjoyeaux, Sainte Adresse (FR); Olivier Hubier, Le Havre (FR)

(73) Assignee: AIRCELLE, Gonfreville l'Orcher ( * ) Notice: Subject to any disclaimer, the term of this patent is extended or adjusted under 35 U.S.C. 154(b) by 436 days.

(21) Appl. No.: 13/958,246

(22) Filed: Aug. 2, 2013

(65) Prior Publication Data
US 2013/0312263 A1 Nov. 28, 2013

Related U.S. Application Data

(63) Continuation of application No. PCT/FR2012/050230, filed on Feb. 2, 2012.

(30) Foreign Application Priority Data

Feb. 4, 2011 (FR) ...................................... 11 50890

(51) Int. Cl.
B64D 33/00 (2006.01)
B23P 15/00 (2006.01)
B29C 70/84 (2006.01)
B64D 33/02 (2006.01)
B29C 70/44 (2006.01)
B29C 70/48 (2006.01)

(52) U.S. Cl.
CPC ............. *B23P 15/008* (2013.01); *B29C 70/84* (2013.01); *B64D 33/02* (2013.01); *B29C 70/44* (2013.01); *B29C 70/48* (2013.01); *B64D 2033/0286* (2013.01); *Y10T 29/49346* (2015.01)

(58) Field of Classification Search
CPC ................. B23P 15/008; B64D 33/02; B64D 2033/0286; B29C 70/84; B29C 70/44; B29C 70/48; Y10T 29/49346
See application file for complete search history.

(56) References Cited

U.S. PATENT DOCUMENTS 4,629,146 A * 12/1986 Lymons ....................... 244/53 R
7,383,679 B2 * 6/2008 Porte et al. .................. 60/226.1
7,838,100 B2 * 11/2010 McLeod et al. .............. 428/172

FOREIGN PATENT DOCUMENTS

EP 1013910 A1 6/2000
FR 2906568 A1 4/2008
FR 2922522 A1 4/2009
FR 2929991 A1 10/2009

OTHER PUBLICATIONS

International Search Report issued in International Application No. PCT/FR2012/050230.

* cited by examiner

Primary Examiner — Richard Chang
(74) Attorney, Agent, or Firm — Burris Law, PLLC

(57) ABSTRACT

A method for manufacturing an air-intake structure for a turbojet-engine nacelle includes two component parts, i.e. one air-intake lip structure and one outer cowl for the air-intake structure. In particular, the method includes the following steps: separately manufacturing the component parts such that each integrates one overlapping portion with a part to which is to be attached. The overlapping portion is configured such that an outer surface of the outer overlapping portion provides continuity with an outer surface of the outer cowl associated with the inner overlapping portion. To secure the overlapping portions, glue or a fastener may be used.

9 Claims, 3 Drawing Sheets

METHOD FOR MANUFACTURING AN AIR INTAKE STRUCTURE FOR A TURBOJET ENGINE NACELLE

CROSS-REFERENCE TO RELATED APPLICATIONS

This application is a continuation of International Application No. PCT/FR2012/050230, filed on Feb. 2, 2012, which claims the benefit of FR 11/50890, filed on Feb. 4, 2011. The disclosures of the above applications are incorporated herein by reference.

FIELD

The present disclosure relates to a method for manufacturing an air intake structure for a turbojet engine nacelle, and an air intake structure manufactured by the method.

BACKGROUND

The statements in this section merely provide background information related to the present disclosure and may not constitute prior art.

As is known in itself, an aircraft propulsion assembly traditionally comprises a turbojet engine housed inside a nacelle.

A nacelle generally has an annular structure comprising an air intake upstream from the turbojet engine, a middle section designed to surround a fan of the turbojet engine and its casing, and a downstream section designed to surround the combustion chamber of the turbojet engine and, if applicable, housing thrust reverser means. It may end with the jet nozzle whereof the outlet is situated downstream from the turbojet engine.

The air intake structure serves to optimize the capture of air necessary to supply the fan of the turbojet engine and channel it toward that fan.

An air intake structure in particular comprises, upstream, a leading edge structure commonly called an air intake "lip."

The air intake lip captures air and is attached to the rest of the air intake structure, which channels the captured air toward the turbojet engine.

To that end, the rest of the air intake structure has a substantially annular structure comprising an outer surface ensuring the outer aerodynamic continuity of the nacelle and an inner surface ensuring the inner aerodynamic continuity of the nacelle. The air intake lip provides the upstream junction between said two walls.

The entire air intake structure is attached upstream from a middle section of the nacelle and a fan casing.

An air intake lip structure may comprise many components. It traditionally in particular includes an aerodynamic skin that may be made from several sectors clipped together, one or more reinforcing partitions, one or more junction profiles for the partitions or for attachment to the rest of the air intake structure.

Currently, these elements may be made from heterogeneous materials, and in particular from alloys of different metals, typically with a base of aluminum and/or titanium. Certain elements may also be made from composite materials.

Today, these elements must be assembled by fastening. This results in a significant assembly time and a loss of aerodynamic performance related to these fastenings and assemblies.

Also known are so-called laminar nacelles with an air intake structure having an outer continuity improving the aerodynamic performance. Such a structure is in particular described in document FR 2,906,568.

Currently, such a laminar structure may be obtained by grouping together the air intake lip and the outer cowl in one single-piece structure, thereby ensuring the absence of fastening means and an optimized outer aerodynamic surface.

The production of such a single-piece structure is not easy and requires dedicated molds and equipment with a suitable size. It therefore remains expensive. Furthermore, it remains difficult to reconcile, in a same manufacturing technology (single-piece product), a lip structure that can have a significant thickness, and a cowling structure that bears few forces and therefore has a much smaller thickness.

SUMMARY

The present disclosure provides a method for manufacturing an air intake structure for a turbojet engine nacelle comprising at least two component parts, including at least one air intake lip structure and at least one air intake structure outer cowl, characterized in that it comprises the following steps:

making the component parts separately so that each integrates at least one portion overlapping the portion with which it is designed to be attached, the overlapping portions being configured such that an outer surface of the outer overlapping portion provides continuity with an outer surface of the part associated with the inner overlapping portion, securing the overlapping portions, in particular by gluing and/or using fastening means.

Thus, by providing overlapping portions designed to provide the connection between the parts, it is possible to provide an outer surface having only a very limited number of aerodynamic accidents.

An outer structure is thus obtained reconciling an outer profile ensuring minimal drag and mass while reducing the assembly elements and the time necessary to place them.

Manufacturing methods of the resin infusion or resin injection type into a dry reinforcing framework, in particular woven, braided or draped, for example, will make it possible to obtain the entire air intake outer structure with a reduced number of operations.

According to one form, the securing is done by overmolding the overlapping portions.

As an alternative, the overlapping portions of the lip structure with the outer cowl are substantially longitudinal and at least partially peripheral, or completely peripheral.

Advantageously, the part forming the air intake lip is a single piece. It may in particular be made from a composite material and may be obtained using a resin infusion, resin injection, or resin transfer molding method, for example.

Advantageously, the part making up the outer cowl is a single piece. It may in particular be made from a composite material and may be obtained using a resin infusion, resin injection, or resin transfer molding method, for example.

According to one alternative form, the part making up the outer cowl will advantageously be made from two half-parts, designed in particular to be clipped to each other. This allows easier adaptation to the diameter of the air intake lip, in particular to take the manufacturing allowances into account.

In one form, the outer cowl forms a drum.

According to one alternative form, the outer cowl forms a shroud open in particular so as to facilitate the integration of the air intake lip.

The present disclosure also relates to an air intake structure that can be obtained using a method according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 4:
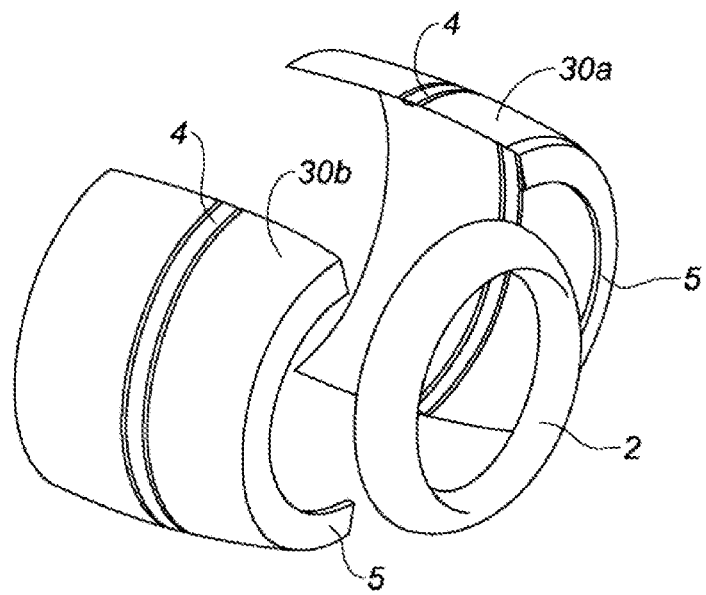
Figure 5:
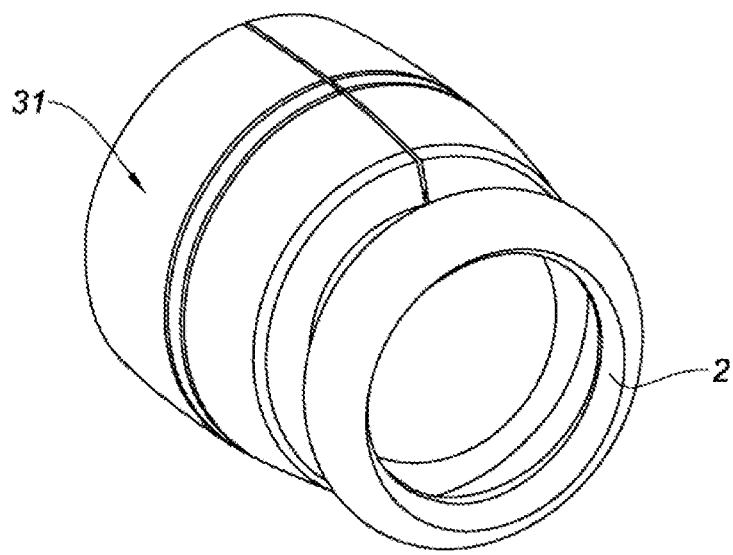
Figure 6:
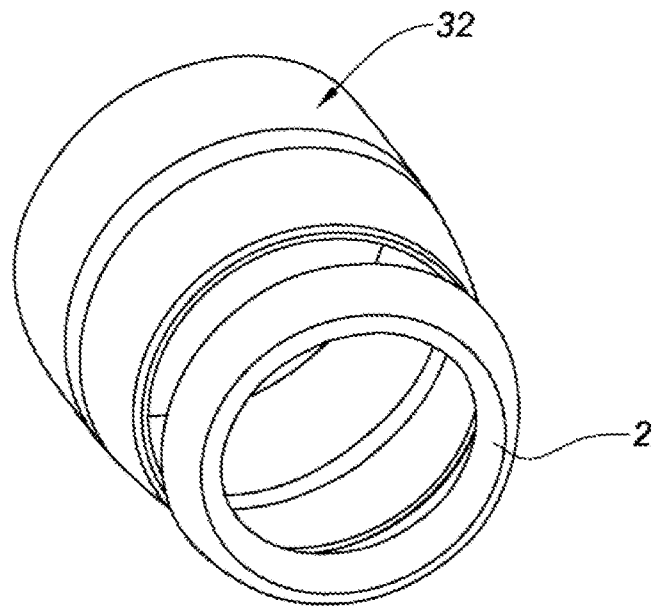
Figure 7:
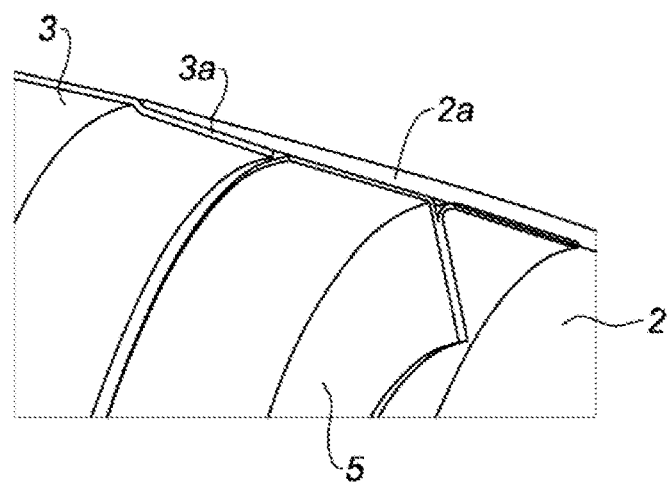

FIGS. 4 to 6 diagrammatically illustrate different alternative forms of an air intake structure according to the present disclosure; and FIG. 7 is an enlarged perspective cross-sectional view of an air intake structure, viewed from the inside of the nacelle, according to the present disclosure obtained according to another alternative form.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
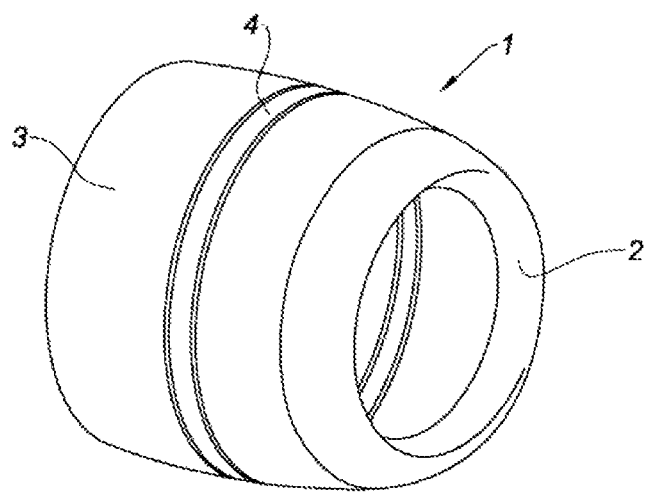
FIG. 1 is a general diagrammatic illustration of an air intake structure according to the present disclosure.

An air intake structure 1 according to the present disclosure, as shown in FIG. 1, comprises an air intake lip structure 2, designed to provide an improved capture of air toward a fan of the turbojet engine, and an outer wall 3 designed to provide the outer aerodynamic continuity of the nacelle and to which the air intake lip structure is attached.

Figure 2:
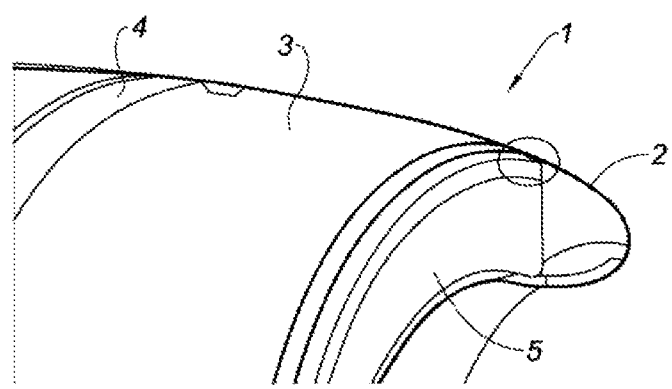
FIG. 2 is a perspective cross-sectional longitudinal view of the air intake structure of FIG. 1, viewed from the inside of the nacelle.
Figure 3:
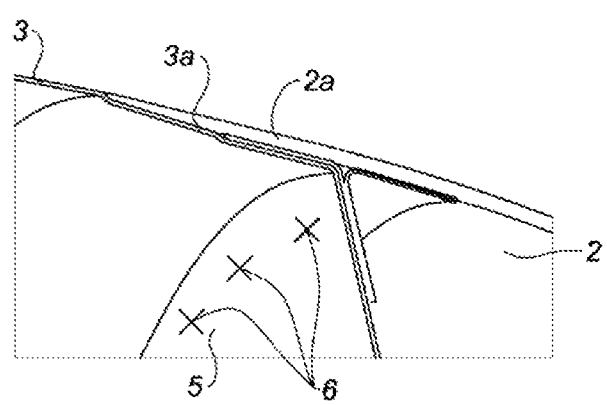
FIG. 3 is an enlarged perspective view of the junction area between the air intake lip and the outer wall of the air intake structure of FIG. 2.

The outer cowl 3, in the example shown in FIGS. 1 to 3, assumes the form of a fully peripheral shroud forming a drum.

The outer cowl 3 may integrate one or more stiffeners, for example a circumferential stiffener 4 shown in FIGS. 1, 2 and 4. It may integrate any other form of stiffeners, with longitudinal or spiral sections and directions, or journal crosses.

The junction between the outer cowl 3 and the air intake lip is done at an upstream separating partition 5 that may be integrated either in the air intake lip or in the shroud, preferably, at the outer cowl 3.

According to the present disclosure, the manufacture of the air intake structure 1 comprises the following steps first aiming to produce the component parts separately, i.e., in the case at hand, the outer cowl 3 and the air intake lip 2, such that each integrates at least one overlapping portion 3a and 2a, respectively, with the part to which it is designed to be attached. The overlapping portions may in particular be made by extending outer skins.

In the case at hand, the overlapping portion 2a of the air intake lip is designed to receive the overlapping portion 3a of the outer cowl 3.

The overlapping portions 3a and 2a are configured such that an outer surface of the outer overlapping portion 2a provides continuity with an outer surface of the part (cowl 3) associated with the inner overlapping portion 3a.

The overlapping portions are then secured, in particular by gluing and/or using fastening means.

If it is present, the upstream partition 5 may also be used to place complementary fasteners 6.

FIGS. 4 to 6 show various forms of the outer cowl 3 and air intake lip 2 structures.

FIG. 4 shows an outer cowl made from two substantially semi-cylindrical half-parts 30a, 30b that may in particular be clipped to each other.

FIG. 5 shows an outer cowl made in the form of an open shroud, aiming to facilitate the integration of the air intake lip 2, in particular to account for machining allowances.

FIG. 6 shows a single-piece outer cowl 32 forming a drum.

The air intake lip 2 may in particular advantageously be a single piece.

FIG. 7 shows an additional form in which the overlapping portions 2a, 3a are assembled by overmolding.

Although the present disclosure has been described with one particular form, it is of course in no way limited thereto and encompasses all technical equivalents of the described means as well as combinations thereof if they are within the scope of the present disclosure.

What is claimed is:

1. A method for manufacturing an air intake structure for a turbojet engine nacelle comprising at least one air intake lip structure and at least one air intake structure outer cowl, the method comprising:

making at least one overlapping portion of said at least one air intake lip structure and another overlapping portion of said at least one air intake structure outer cowl separately in the nacelle, said overlapping portion of said at least one air intake lip structure being attached over said overlapping portion of said at least one air intake structure outer cowl such that an outer surface of said at least one overlapping portion of said at least one air intake lip structure provides a continuous outer mold line with an outer surface of said at least one air intake structure outer cowl; and securing said overlapping portions by at least one of gluing and fastening means.

2. The method according to claim 1, wherein the securing is done by overmolding the overlapping portions.

3. The method according to claim 1, wherein the overlapping portion of said at least one air intake structure outer cowl is substantially longitudinal and at least partially peripheral.

4. The method according to claim 3, wherein the overlapping portion of said at least one air intake lip structure is substantially longitudinal and completely peripheral.

5. The method according to claim 1, wherein a part forming said at least one air intake lip structure is a single piece.

6. The method according to claim 1, wherein a part making up said at least one air intake structure outer cowl is a single piece.

7. The method according to claim 6, wherein said at least one air intake structure outer cowl forms a drum.

8. The method according to claim 6, wherein the outer cowl forms a shroud open.

9. The method according to claim 1, wherein a part making up said at least one air intake structure outer cowl is made from two half-parts, configured to be clipped to each other.

\* \* \* \* \*